Jan. 16, 1934.  J. R. KONETSKY  1,943,734

FIFTH WHEEL

Filed Oct. 5, 1932

INVENTOR.
JOHN R. KONETSKY
BY
ATTORNEYS.

Patented Jan. 16, 1934

1,943,734

UNITED STATES PATENT OFFICE 1,943,734

FIFTH WHEEL

John R. Konetsky, San Francisco, Calif.

Application October 5, 1932. Serial No. 636,373

10 Claims. (Cl. 280—125)

My invention relates to improvements in fifth wheels and it consists of the combinations, constructions and arrangements hereinafter described and claimed.

An object of my invention is to provide a fifth wheel for a trailer which is extremely simple in construction, and in which the parts may be disassembled and packed in a small space for shipment. The device makes use of a casting supported by springs, this casting having a circular top with outwardly extending rollers. The rollers in turn are received in an annular channel, the channel being secured to the chassis of the trailer.

Other objects and advantages will appear in the following specification, and the novel features of the device will be particularly pointed out in the appended claims.

Figure 1:
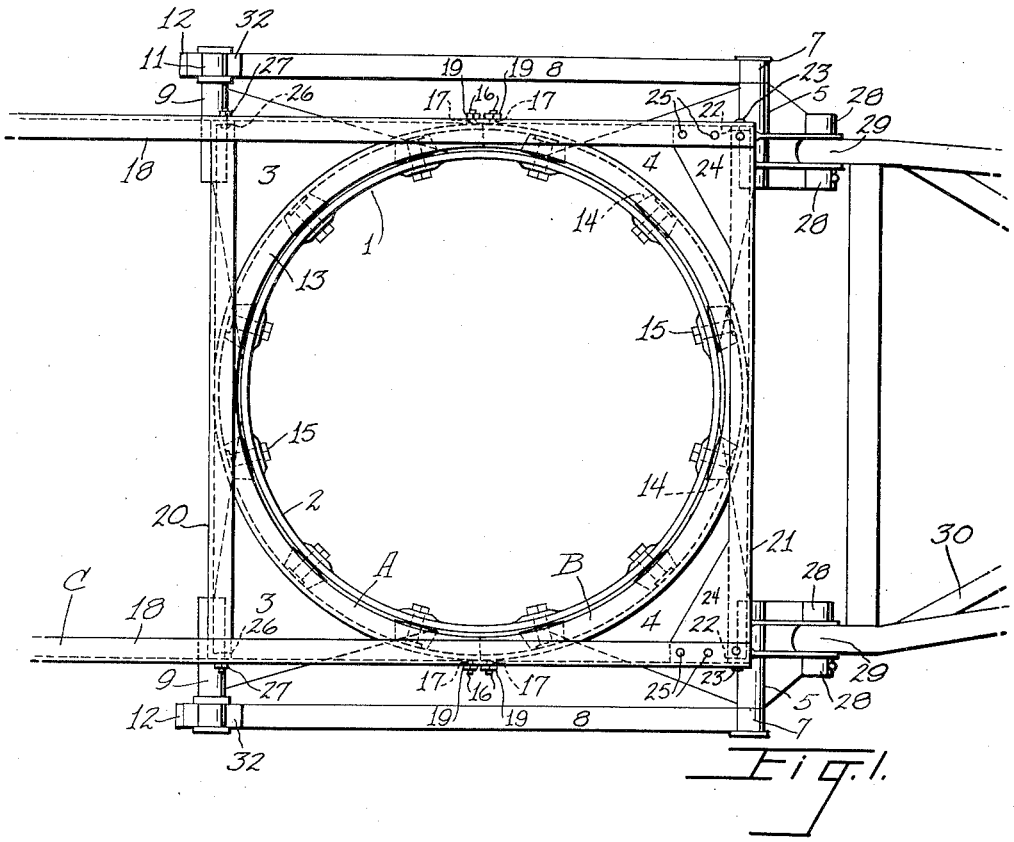
Figure 2:
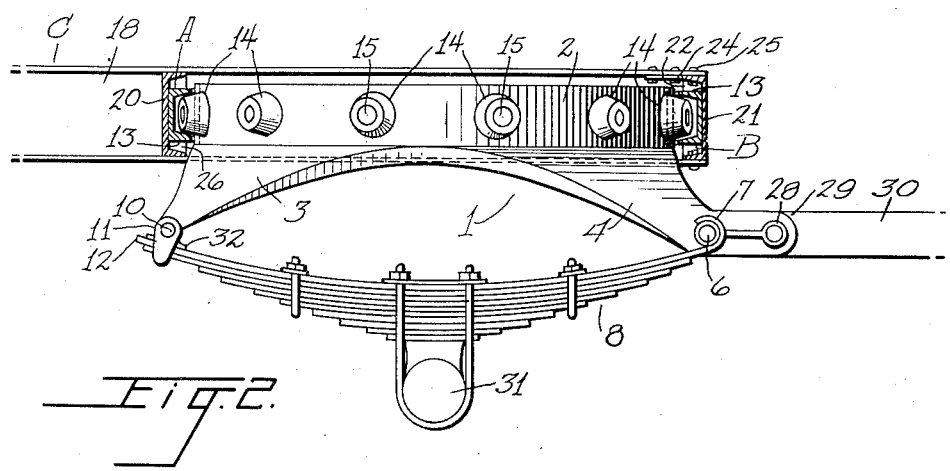

My invention is illustrated in the accompanying drawing forming part of this application, in which Figure 1 is a top plan view of the device, and Figure 2 is a longitudinal section through the device with portions being shown in elevation.

In carrying out my invention I provide a casting indicated generally at 1, and this casting has a circular band 2 at its top, and four legs 3—3 and 4—4. The front legs 4—4 carry bearings 5, and these bearings in turn support stub shafts 6, and the projecting portions of the shafts receive one end 7 of a leaf spring 8.

The rear legs 3 also have bearings 9 for receiving stub shafts 10 and these shafts carry spring hangers 11. The spring hanger 11 receives the ends 12 of the leaf spring 8 and the ends 12 have a sliding connection with the spring hanger in the manner fully set forth in my copending application.

An annular channel 13 formed of two semi-circular parts A and B receives rollers 14 that project outwardly from the band 2. Each roller is mounted upon a bolt 15 which in turn is secured to the band. The parts A and B of the channel 13 have outwardly extending threaded shanks 16 and these are received in openings 17 in side channels 18 of a trailer chassis indicated generally at C. Nuts 19 are threaded upon the shanks 16 and secure the parts A and B together and to the side members 18.

The parts A and B are also secured to transverse channels 20 and 21 by any suitable fastening means such as welding or the like. The channel 21 has its ends 22 bent and secured to the side channels 18 by bolts 23. The top flange of the channel 21 has enlarged portions 24 disposed adjacent to its ends and these portions are secured to the top flange of the side channels 18 by bolts 25.

The rear channel 20 also has its ends 26 bent at right angles and secured to the side channels 18 by bolts 27. It will be seen from this construction that the side channels 18 may be removed from the transverse channels 20 and 21, and that the transverse channels carry the parts A and B, which in turn may be removed from each other for shipment. In disassembling the parts it is merely necessary to remove the various bolts.

The front legs 4 also carry bearings 28 for receiving the ends 29 of a trailer tongue 30. This tongue is connected to a truck not shown. The rear end of the trailer C is not illustrated because the present invention is confined to the construction of the fifth wheel. The leaf springs 8 support a front axle 31 and wheels not shown are mounted upon the axle for carrying the front end of the trailer.

The vertical movement of the axle 31 with respect to the trailer chassis C is taken up by the longitudinal movement of the end 12 of the leaf spring 8. The bearing plate 32 of the spring hanger rocks about the shaft 10 during this movement, and slides on the end 12 of the leaf spring. Turning movement of the truck and the trailer causes the casting 1 to rotate with respect to the chassis C and this will cause the rollers 14 to ride in the channel 13. The weight on the chassis C is transmitted to the casting 1 through the rollers 14.

While I have shown only the preferred form of my invention, it should be understood that various changes or modifications may be made within the scope of the appended claims without departing from the spirit of the invention.

I claim:

1. A fifth wheel comprising a casting having a circular band, rollers projecting radially from the band, outwardly flaring legs supporting the band and joined thereto so as to leave the outer surface of the band unobstructed, an annular channel receiving the rollers and composed of two semi-circular sections having outwardly extending threaded shanks, a trailer chassis having openings in its sides for receiving the shanks, nuts receivable by the shanks, said trailer having transverse pieces secured to the annular channel and to the trailer sides.

2. A fifth wheel comprising a casting having a circular band, rollers projecting radially from the band, outwardly flaring legs supporting the band and joined thereto so as to leave the outer surface of the band unobstructed, an annular channel receiving the rollers and composed of two semi-circular sections having outwardly extending threaded shanks, a trailer chassis having openings in its sides for receiving the shanks, nuts receivable by the shanks, said trailer having transverse pieces secured to the annular channel and to the trailer sides, and springs supporting the legs.

3. A fifth wheel comprising a casting having a circular band and legs supporting the same, springs supporting the legs, outwardly extending rollers carried by the band, an annular channel for receiving the rollers and a trailer chassis having one end connected to the channel, the legs flaring outwardly and merging into the lower edge of the band so as to leave the rollers unobstructed.

4. A trailer chassis construction comprising vertically disposed side members and transverse members forming a substantial square, and an annular channel formed of two semi-circular pieces secured to the side and transverse members and confined between the upper and lower edges thereof.

5. A trailer chassis construction comprising side channel irons and transverse channel irons removably secured to the side channel irons, all of the channel irons facing toward each other, and semi-circular channels having their midpoints secured to the transverse channels and their ends secured to the side channel, whereby the circular channels form a continuous annular channel, the latter being confined between the upper and lower flanges of the channel irons.

6. In fifth wheel construction, a casting comprising a circular band, outwardly extending rollers carried by the band and outwardly flaring legs for supporting the band, the legs being joined to the band so as to leave the outer surface of the band unobstructed.

7. In fifth wheel construction two parallel channels and two transverse channels removably secured thereto to form a square, the transverse channels having complementary channel-shaped ring sections secured to the webs thereof adapted to form a complete annular track within the channels when the transverse channels are secured in place.

8. In fifth wheel construction two parallel channels and two transverse channels removably secured thereto to form a square, the transverse channels having complementary channel-shaped ring sections secured to the webs thereof adapted to form a complete annular track within the channels when the transverse channels are secured in place, and the ring sections having means for securing their ends to the first channels respectively.

9. In fifth wheel construction, a rectangular frame consisting of channels having upper and lower flanges turned inwardly, a circular track confined between the channels and between the upper and lower flanges thereof and a ring having rollers supporting the track and downwardly extending legs for supporting the ring.

10. In fifth wheel construction, a rectangular frame consisting of channels having upper and lower flanges turned inwardly, a circular track confined between the channels and between the upper and lower flanges thereof and a ring having rollers supporting the track and downwardly extending legs for supporting the ring, the latter having a bottom flange engageable with the rollers for holding the track to the rollers.

JOHN R. KONETSKY.